March 13, 1951     M. K. GOLDSTEIN     2,544,669
DIRECTION FINDER
Filed Aug. 9, 1945     3 Sheets-Sheet 1
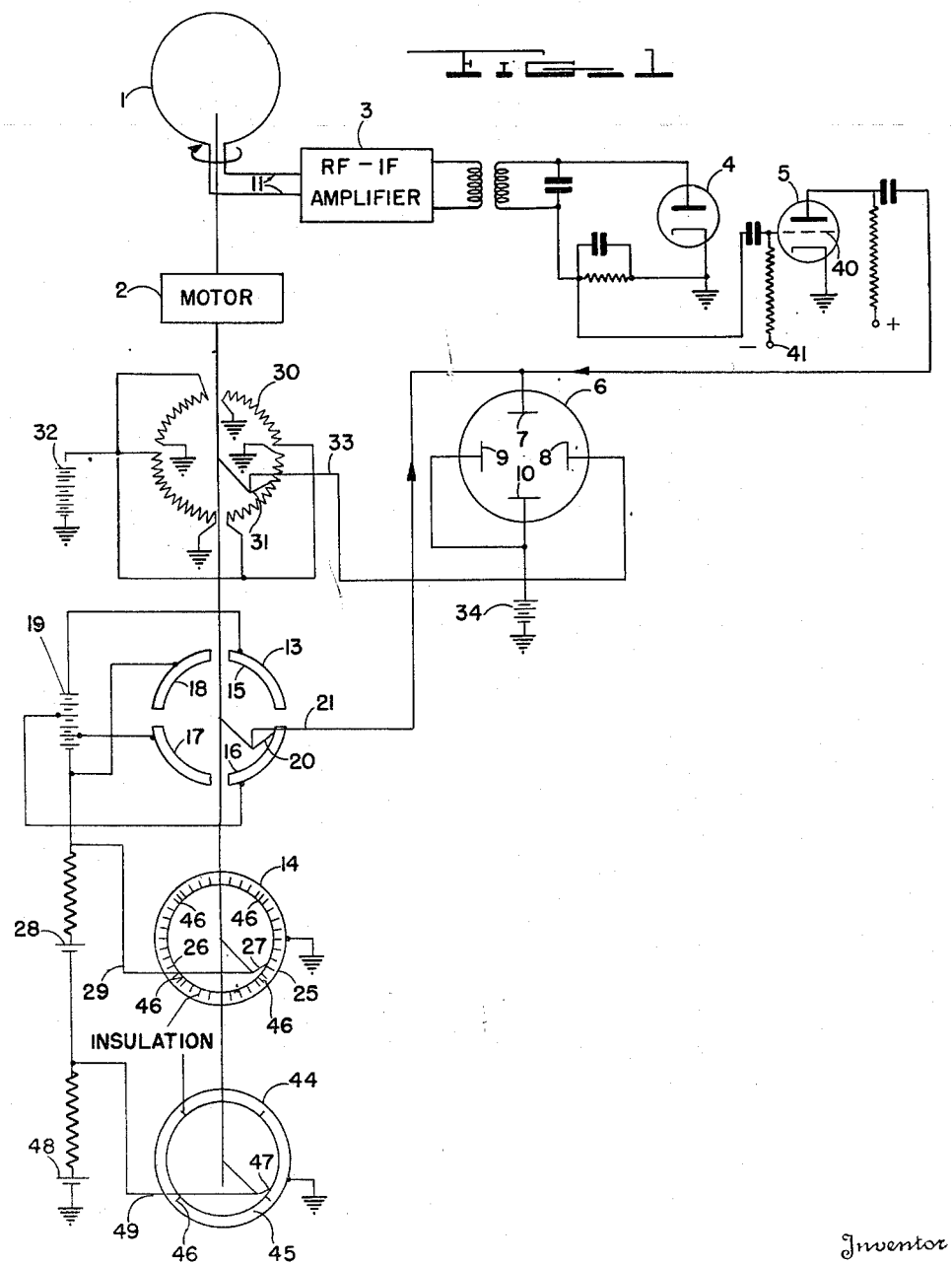
Inventor
MAXWELL K. GOLDSTEIN
By Ralph L. Chappell
Attorney March 13, 1951    M. K. GOLDSTEIN    2,544,669
DIRECTION FINDER
Filed Aug. 9, 1945    3 Sheets-Sheet 2
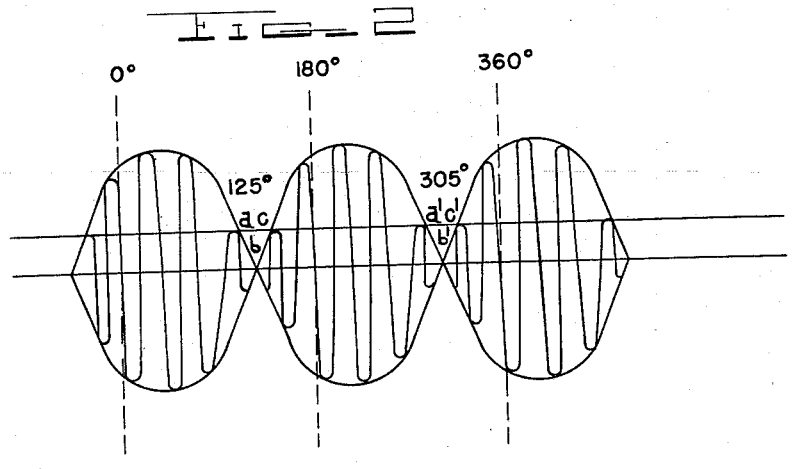
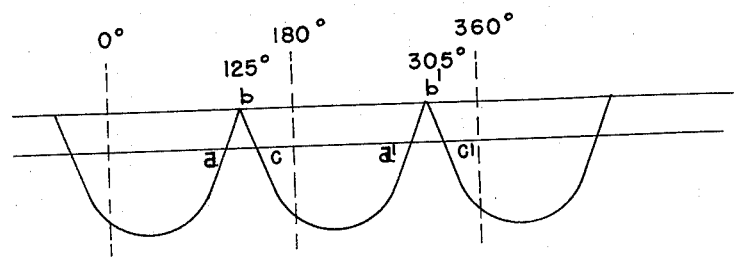
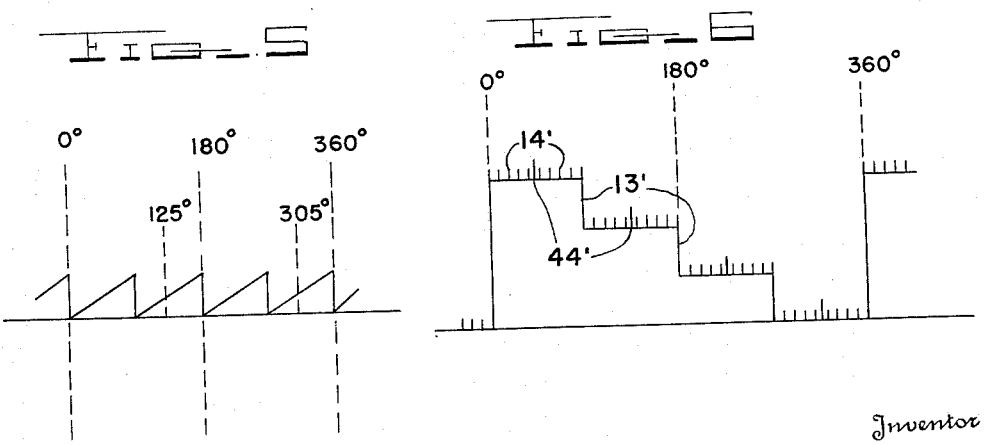
Inventor
MAXWELL K GOLDSTEIN
By Ralph L Chappell
Attorney March 13, 1951     M. K. GOLDSTEIN     2,544,669
DIRECTION FINDER Filed Aug. 9, 1945     3 Sheets-Sheet 3

Inventor
MAXWELL K GOLDSTEIN
By Ralph L Chappell
Attorney

Patented Mar. 13, 1951

2,544,669

UNITED STATES PATENT OFFICE 2,544,669

DIRECTION FINDER

Maxwell K. Goldstein, Washington, D. C.

Application August 9, 1945, Serial No. 609,908

5 Claims. (Cl. 343—118)

(Granted under the act of March 3, 1883, as amended April 30, 1928; 370 O. G. 757)

This invention relates to direction finders, and is particularly directed to recurrently searching systems which give automatic indication of the direction of a received transmission.

Such direction finding systems normally include a directional antenna whose directional pattern is recurrently swept over the azimuth angle to be monitored. The output of the antenna system is fed to the receiver which provides an output signal when a singular directional characteristic of the antenna system is swept across the incoming transmission. The receiver output signal is applied to some indicating means which conventionally includes a mechanical element operated in synchronism with the directional antenna control.

Such systems demand synchronized mechanical movement of the antenna control means and of the above mentioned mechanical element of the indicating means. Consequently, such systems are not adaptable to remote or plural indication.

It is accordingly an object of the present invention to provide a direction finding system which supplies an output inherently carrying information with respect to the direction of an incoming signal which may be applied remotely to a self-contained indicator or indicators.

It is another object of the invention to provide a direction finder giving an output which may be directly applied to a cathode ray tube indicator or indicators to give an indication of the direction of a received transmission.

It is another object of the invention to provide a direction finder giving an instantaneous indication of the direction of a received transmission without any manual adjustment by the operator except to tune the receiver to the desired frequency.

It is another object of the invention to provide a direction finder having a high power of resolution between signals coming from very nearly identical bearings, and thus a high degree of accuracy of indication.

It is another object of this invention to provide a direction finder whose bearing indications do not vary with variations in the speed of rotation of the direction pattern of the antenna system.

It is another object of this invention to provide a direction finder having a method of presentation of bearing indications in which the receiver output signal is applied to only one element of the indicating device, such as one deflecting plate of a cathode ray tube, so that there is no necessity to stabilize the gain in two amplification channels as there may be in those systems in which the receiver output signal is constituted of two components which are applied to two different elements of the indicating device.

The invention will be further described with reference to the exemplary embodiment shown in the drawings, in which:

Figure 1 shows schematically an embodiment of the invention,

Figures 2 through 7 show waveforms of various voltages and currents which are present during the operation of the system of Figure 1.

Figure 4:
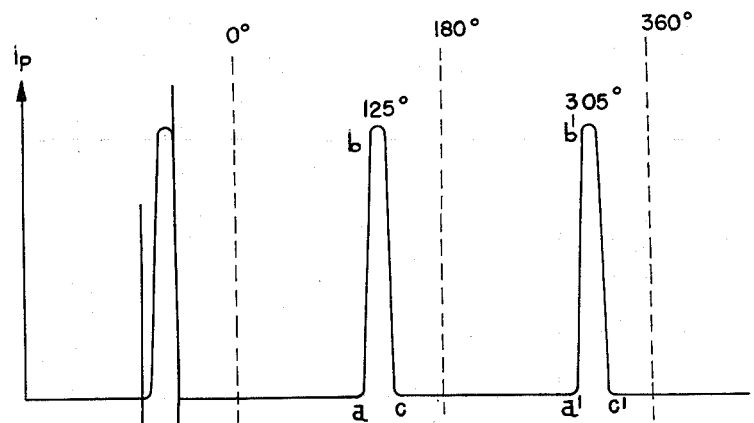

The embodiment of the invention shown in Figure 1 includes a directional antenna 1. The spatial orientation of the directional sensitivity pattern of antenna 1 is continuously rotated by a driving motor 2. In this embodiment, antenna 1 comprises a loop which itself is physically driven by the motor.

The output of antenna 1 is fed to a receiver unit comprising a radio and intermediate frequency amplifier 3 which drives a diode demodulator stage 4 which excites amplifier 5. The output of amplifier 5, together with certain voltages generated as described below in synchronism with the rotation of the directional antenna pattern, inherently carries information as to the direction of the received transmission which may be directly applied to a suitable indicator. In the embodiment of Figure 1 this indicator is shown as a voltage operated cathode ray tube 6 having electrostatic deflection plates 7, 8, 9, and 10.

As will be understood the output of loop antenna 1 is communicated through leads 11 to the receiver unit. The loop output under a continuous wave transmission is such as is shown in Figure 2, the output falling to zero as the wave impinges broadside on the antenna. In the waveform shown in Figure 2, the received transmission is being propagated from a direction of 125° or 305°.

In the system of Figure 1, zero output of the antenna is employed as the singular directional characteristic from which the receiver output signal is derived. As shown in Figure 1, a negative output is obtained from demodulator stage 4 having a waveform substantially as shown in Figure 3.

This output voltage is applied to an amplifier 5, which in this embodiment constitutes an overbiased amplifier in which control element 40 is returned to a source of negative potential 41.

The operation of the non-linear amplifier is apparent from Figure 4. The grid potential is below plate cutoff except on the most positive peaks of the grid signal which are produced in synchronism with alignment of the antenna system null and the direction of the received transmission. On the grid signal peaks the amplifier stage is driven substantially to saturation to provide the plate current pulses shown in Figure 4.

In Figures 2, 3, and 4, $a$, $b$, and $c$ and $a'$, $b'$, and $c'$ have been used to indicate corresponding points in time. Thus it will be seen that the plate current pulses shown in Figure 4 occur at precisely the instant that the zero output point of the antenna is swept across the azimuth angle of the received signal.

In order to obtain an output from the direction finder embodying information as to the direction of the received transmission, in the system of Figure 1 the receiver output signal is applied to the vertical deflecting plate 7 of cathode ray tube indicator 6, and certain other voltages are applied to the cathode ray tube vertical and horizontal deflecting plates at the same time.

Vertical deflecting plate 7 has applied to it continuously while antenna 1 is rotating a voltage of the general waveform illustrated in Figure 6. This voltage is composed of two components, generated by step wave generator 13 and marker pip generators 14 and 44 respectively. The first component is a periodic voltage which remains at some initial positive value for a certain fraction $1/n$ of its period, for example one-quarter, then suddenly decreases to a positive value smaller than its initial value by a fraction $1/n_{-1}$, and continues this step-wise reduction until it has completed its cycle by reaching zero potential and remaining there for the fraction $1/n$ of its period. The second component may be comprised of a series of small positive voltage pulses which are repeated at intervals of some fraction, for example $1/9n$ or one thirty-sixth, of the period of the first component, plus another series of positive voltage pulses of different amplitude which are repeated at intervals of some other fraction, for example $1/n$ or one quarter, of the period of the first component.

Step wave generator 13 may be any such generator known to the art. In the system of Figure 1, four conducting quadrants 15, 16, 17 and 18 (the number $n$ in the above fractions having been chosen as four) are arranged about a common center point, are insulated from each other, and are connected as shown in Figure 1 to a source of D. C. potential 19 at points whose potentials vary by steps of one-third from the highest point, which is connected to quadrant 15, to the lowest point, which is connected to quadrant 18. These four quadrants are swept by brush contact 20 which is rotated by motor 2 in synchronism with antenna 1. The quadrants are so positioned that the step voltage wave produced at contact 20 and taken off through lead 21 will rise to a maximum at the instant the antenna loop rotating in a clockwise direction passes through zero bearing, will remain at that value until the instant the antenna passes through a bearing of 90° when it will decrease by one third of its initial value, will remain at this two-thirds value until the instant the antenna passes through a bearing of 180° when it will decrease again by one-third of its initial value, will remain at this one-third value until the instant the antenna passes through a bearing of 270° when it will decrease again by one third of its initial value, and will remain at zero potential until the antenna reaches a bearing of 360° and completes one revolution. (In this specification the rotating antenna will be considered to pass through a certain bearing when the chosen singular directional characteristic of the antenna system sweeps across that bearing.) The described step-wise reductions in voltage, of course, need not be uniform in amplitude if this is not desired, but are so in the system of Figure 1.

In the marker pip generator 14 shown in the embodiment of Figure 1 a commutator ring, composed of a grounded conducting ring 25 whose inner circumference is divided at equal distances by narrow insulating segments 26, is swept by brush 27 rotated by motor 2 in synchronism with antenna 1. The number of marker pips formed by marker pip generator 14 during each complete step wave cycle or one revolution of antenna 1 has been chosen as thirty-six in the embodiment of Figure 1, so the segments 26 are thirty-six in number. They are so positioned that brush 27 sweeps across one of the segments 26 at the instant antenna loop 1 passes through zero bearing. As shown in Figure 1, brush 27 is connected through lead 29 to a source of D. C. potential 28, which is in turn connected to the lowest point in the source of D. C. potential 19.

As will be seen, while brush 27 is in contact with ring 25 said lowest point is returned directly to ground, but whenever brush 27 is in contact with insulating segments 26 said lowest point is returned to ground through D. C. potential source 28. Thus, a train of small positive voltage pulses will be added in series to the voltage generated as described above in step wave generator 13. Marker pip generator 14 could of course be any other system for producing such a train of pulses which is known to the art.

Marker pip generator 14 is also shown in the embodiment of Figure 1 modified so as to provide, in conjunction with marker pip generator 44, four voltage pulses of larger amplitude which occur at the instant antenna loop 1 passes through bearings of 45°, 135°, 225°, and 315°. Narrow insulating segments 46 insulate brush 27 from ring 25 and thus from ground at the four instants named. This produces at these instants voltage pulses similar to those already described, to which are added other similar pulses from marker pip generator 44.

In marker pip generator 44 a commutator ring, composed of grounded conducting ring 45 with its inner circumference divided into quadrants by narrow insulating segments 46, is swept by brush 47 rotated by motor 2 in synchronism with antenna 1. These segments 46 are so positioned that they will be swept by brush 47 at the same instants that the corresponding segments 46 in marker pip generator 14 are swept by brush 27. Brush 47 is connected through lead 49 to a source of D. C. potential 48, which is in turn connected to the lowest point in source of D. C. potential 28.

The operation of marker pip generator 44 is similar to that of marker pip generator 14. As will be seen, these two generators will combine to produce a train of voltage pulses of larger amplitude than the first train of pulses already described, and occurring when antenna loop 1 passes through bearings of 45°, 135°, 225°, and 315°. This second train of pulses like the first will be added in series to the voltage generated by step wave generator 13.

Combining these two trains of pulses with the output of step wave generator 13 produces a voltage having the waveform shown in Figure 6. As here shown the step-wise voltage variations generated by generator 13 occur every 90° of antenna rotation and are designated by the reference character 13'. The 10° markers generated by generator 14 are identified by the reference characters 14' and the 45° markers generated by generator 44 are shown at 44'. If a receiver output pulse such as that shown in Figure 4 is combined with this voltage, the resultant voltage will have the waveform shown in Figure 7, which is the voltage applied to vertical deflecting plate 7 of the cathode ray tube. It will be seen that the time relationship of the receiver output pulse and the step wave voltage uniquely characterizes the orientation of the directional sensitivity pattern of the antenna system at the time of delivery of the output impulse from the receiver unit. As has been said, in Figure 2 the received transmission is being propagated from a direction of 125° or 305°.

Horizontal deflecting plate 8 has applied to it continuously while antenna 1 is rotating a voltage having a triangular waveform and a frequency which is some harmonic of the frequency of rotation of the antenna. In the system of Figure 1 this voltage has the general waveform illustrated in Figure 5, and is derived from sawtooth generator 30. This sawtooth generator may be any such generator known to the art. In the embodiment of Figure 1 a potentiometer, consisting of four linearly wound quadrant-shaped resistances arranged about a common center point and insulated from each other, is swept by brush contact 31 which is rotated by motor 2 in synchronism with antenna 1. The first point of each quadrant with which brush 31 comes into contact is grounded, the other end of each quadrant being connected to a source of D. C. potential 32. The quadrants are so positioned that the sawtooth voltage wave produced at contact 31 and taken off through lead 33 will start at zero potential at the moment the antenna loop rotating in a clockwise direction passes through zero bearing and will increase linearly until its maximum value is reached at the instant the antenna passes through a bearing of 90°, when it drops instantaneously to zero potential again. The sawtooth voltage wave then repeats this cycle three more times during one complete revolution of the antenna loop, rising linearly to a maximum, and dropping instantaneously to zero as the rotating antenna passes through bearings of 180°, 270°, and 360°. The number of such cycles of this sawtooth voltage for one revolution of the antenna is, as will be observed, equal to the number of steps $n$ in the step voltage of Figure 6 for one revolution of the antenna.

As shown in Figure 1, deflecting plates 9 and 10 of cathode ray tube 6 are connected to source of D. C. potential 34. This positive potential causes the electron beam trace to return to the lower left hand corner of the cathode ray tube screen whenever deflecting plates 7 and 8 are at zero potential.

Figure 7:
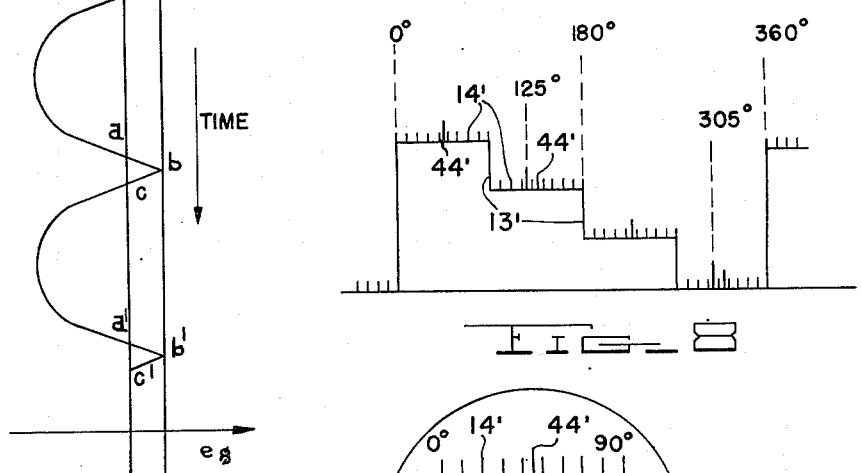
Figure 8:
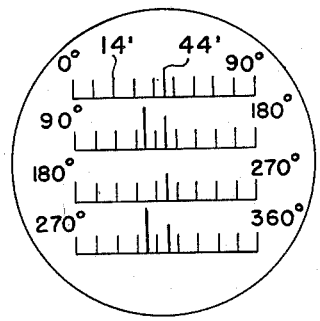
Figure 8 shows the type of indication obtained by means of a cathode ray tube operated by the system of Figure 1.

It will be seen that application to vertical deflecting plate 7 of a voltage such as is shown in Figure 7 and described above, at the same time that a voltage such as is shown in Figure 5 and described above is applied to horizontal deflecting plate 8, will result in a type indication shown in Figure 8. Figure 8 specifically examples the indication of the cathode ray tube under application of the output impulse from the receiver such as is shown in Figure 4.

The number of horizontal sweep lines in the type indication shown in Figure 8 is determined by the number of steps in the step wave voltage generated by step wave generator 13. This is in turn determined by the number $n$ of arculate conductors into which the circle swept by brush contact 20 is divided.

As shown in Figure 8, the number of degrees of arc represented by each horizontal sweep may be marked upon the face of the cathode ray tube indicator. If still further resolution is desired, the number of degrees represented by one horizontal sweep line may be decreased by increasing the number of steps per revolution of antenna 1 in the step wave of Figure 6 and increasing by the same amount the number of cycles per revolution of antenna 1 in the sawtooth wave of Figure 5.

In the above discussion it has been assumed that the speed of rotation of motor 2 remains constant. This of course may not be true. If it is not, then the increase of voltage in the sawtooth wave of Figure 5 will not always be linear, and therefore the electron beam of cathode ray tube 6 will not be swept across the screen at a uniform rate, and may trace out the horizontal lines of Figure 8 in different periods of time in successive sweeps.

Nevertheless, in the embodiment of Figure 1 if the D. C. potential at 32 remains constant the indication of direction of the received transmission will remain constant despite any variations in the speed of motor 2. This is so because such variations in speed affect the speed of rotation of antenna 1 and brushes 20 and 27 as well as of brush 31, and thus the horizontal position of the receiver output pulse and the marker pips remain the same even if successive impulses actuating a particular spot on the fluorescent screen occur at irregular time intervals.

In other words, although each cycle of the sawtooth voltage may not be exactly periodic it will have a leading edge whose slope at any instant is exactly proportional to the speed of rotation of motor 2 at that instant and each cycle will have as before a vertical trailing edge occurring at the instant antenna 1 passes through bearings of 90°, 180°, 270° and 360°. (It will be understood that the term "cycle" as used in this specification and the appended claims is meant to include any complete course of operations, whether exactly periodic or not, with a return to an original state.) Furthermore, the step-wise decreases in the step wave voltage and the generation of the marked pip voltage pulses will occur at precisely the same bearings of antenna 1 as before, despite the fact that the rotation of antenna 1 is no longer exactly periodic due to the variations in the speed of motor 2.

It will be observed that the type indication of bearing shown in Figure 8 may be delivered remotely to any desired number of indicators, only one of which is shown in Figure 1.

It will be understood that the embodiments shown and described are exemplary only, and that the scope of the invention will be determined with reference to the appended claims.

The invention described herein may be manufactured and used by or for the Government of the United States of America for governmental purposes without payment of any royalties thereon or therefor.

What is claimed is:
1. In a radio direction finder, a receiver, a directional antenna system feeding said receiver including directional control means operative to rotate the antenna directional orientation continuously, means responsive to said control means to develop a recurrent triangular signal waveform synchronized at a harmonic of the antenna directional orientation rotation frequency, means to develop a stepwise signal waveform synchronized with inflection points of the triangular waveform and recurring at the antenna rotation frequency, means in said receiver operative to deliver an output signal when a particular directional characteristic of the antenna system is varied with relation to an incoming transmission, a cathode ray tube, means for deflecting the beam of said cathode ray beam responsive to the triangular signal waveform and the stepwise signal waveform to establish parallel rectilinear sweep loci on the cathode ray tube screen, and beam control means responsive to the receiver output signal.

2. In a radio direction finder, a receiver, a directional antenna system feeding said receiver including directional control means operative to rotate continuously the antenna directional orientation, means responsive to said control means to develop a recurrent sawtooth signal waveform synchronized at a harmonic of the antenna directional orientation rotation frequency, means coupled to said control means to develop a stepwise signal waveform synchronized with inflection points of the sawtooth waveform and recurring at the antenna rotation frequency, means in said receiver operative to deliver an output signal pulse when a particular directional characteristic of the antenna system is varied with relation to an incoming transmission, a cathode ray tube, means for deflecting the beam of said cathode ray tube responsive to the sawtooth signal waveform and the stepwise signal waveform to establish parallel rectilinear sweep loci on the cathode ray tube screen, and further beam control means responsive to the receiver output signal.

3. In a radio direction finder, a receiver, a directional antenna system feeding said receiver including directional control means operative to rotate continuously the antenna directional orientation, means responsive to said control means to develop a recurrent triangular signal waveform synchronized at a harmonic of the antenna directional orientation rotation frequency, means to develop a stepwise signal waveform synchronized with inflection points of the triangular waveform and recurring at the antenna directional orientation rotation frequency, means for generating recurrent voltage pulses synchronized at a harmonic of the antenna rotation frequency, means in said receiver operative to deliver an output signal when a particular directional characteristic of the antenna system is varied with relation to an incoming transmission, a cathode ray tube, means for deflecting the beam of said cathode ray tube responsive to the triangular signal waveform and the stepwise signal waveform to establish parallel rectilinear sweep loci on the cathode ray tube screen, beam control means responsive to the recurrent voltage pulses to establish marker pips dividing said rectilinear sweep loci into a number of divisions, and further beam control means responsive to the receiver output signal.

4. A radio directional finder comprising directional pick-up means for receiving signals from incoming radio waves, control means for rotating the directional reception pattern of said pick-up means whereby the received signals are cyclically varied in amplitude, means deriving a pulse signal from said cyclically varying signal, a cathode ray tube indicator connected to display said pulse signal, beam sweeping means operated by said control means and connected to said cathode ray tube to produce a plurality of parallel rectilinear sweep lines, one line for each predetermined fractional part of a rotation in a complete revolution of the antenna pattern, and pulse generating means operated by said control means connected to said cathode ray tube to produce an angle marker pulse at predetermined angles in the rotation of said antenna pattern.

5. A radio direction finder comprising directional pick-up means for receiving signals from incoming radio waves, control means for rotating the directional reception pattern of said pick up means whereby the received signals are cyclically varied in amplitude, means deriving a pulse signal from the signal minimums of said cylically varied signal, a cathode ray tube indicator connected to display said pulse signal, beam sweeping means operated by said control means to produce a plurality of parallel rectilinear sweep lines, one line for each quadrant of rotation in a complete revolution of the reception pattern, and pulse generating means operated by said control means connected to said cathode ray tube to produce angle marker pulses at predetermined angles in the rotation of said antenna pattern.

MAXWELL K. GOLDSTEIN.

REFERENCES CITED

The following references are of record in the file of this patent:

UNITED STATES PATENTS

| Number | Name | Date |
| --- | --- | --- |
| 2,237,604 | Marique | Apr. 8, 1941 |
| 2,320,908 | Busignies | June 1, 1943 |
| 2,403,429 | Anderson | July 9, 1946 |
| 2,405,238 | Seeley | Aug. 6 1946 |